Figure 1:
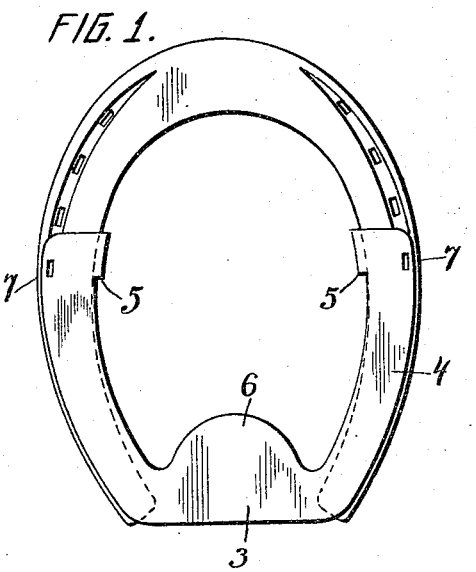

G. H. BURKE.
SPRING HEEL FOR HORSESHOES.
APPLICATION FILED APR. 23, 1915.

1,170,218.

Patented Feb. 1, 1916.

Witnesses
Lionel R. Fiedler
R. E. Rousseau

Inventor
G. H. Burke.
By Gruby & Doyle.
Attorney

THE COLUMBIA PLANOGRAPH CO., WASHINGTON, D. C.

UNITED STATES PATENT OFFICE.

GORDON H. BURKE, OF PLYMOUTH, NEW HAMPSHIRE.

SPRING-HEEL FOR HORSESHOES.

1,170,218.  Specification of Letters Patent.  Patented Feb. 1, 1916.

Application filed April 23, 1915. Serial No. 23,292.

*To all whom it may concern:*

Be it known that I, GORDON H. BURKE, a citizen of the United States, residing at Plymouth, in the county of Grafton, State of New Hampshire, have invented certain new and useful Improvements in Spring-Heels for Horseshoes, of which the following is a description, reference being had to the accompanying drawings, forming a part hereof.

My invention relates to spring heels for horseshoes, adapted to be quickly secured to a horseshoe of a type in general use.

The object is to provide an article of manufacture of a cheap and practical construction possessing the necessary durability, which may be quickly attached in place to the ordinary shoe and requiring no change in the shoe.

Another object in view is to provide a thoroughly practical spring heel that will relieve the animal from shock in traveling on hard pavements, at the same time possessing no perishable substance as a cushioning means that will deteriorate or become displaced, thereby losing the benefits for which devices of this character are intended.

Similar reference numerals indicate corresponding parts in the several views in which—

Figure 2:
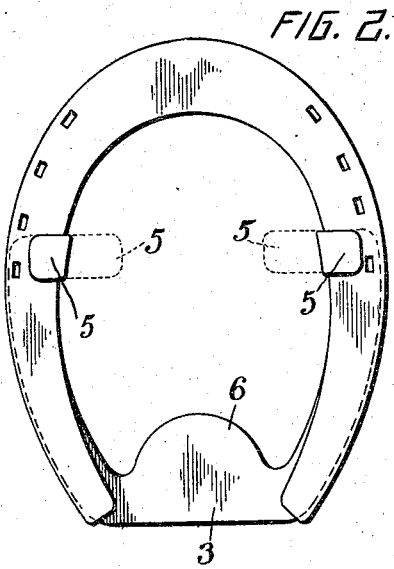
Figure 3:
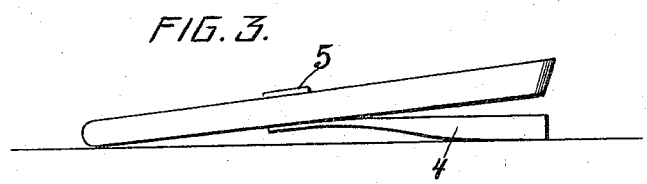
Figure 4:
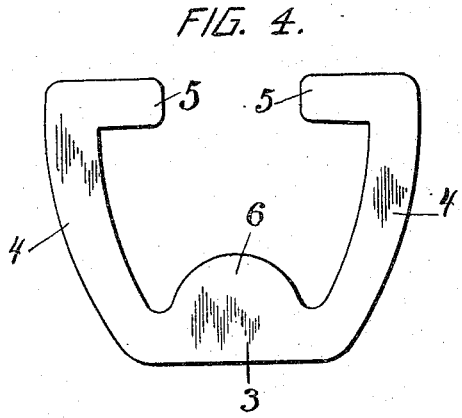

Figure 1 is a bottom plan view of a horseshoe to which my improved spring heel has been applied. Fig. 2 is a top plan view of the parts as shown in Fig. 1. Fig. 3 is a side view, and, Fig. 4 is a plan view of the spring heel prior to its application to a horseshoe.

Reference being had to the drawings, 1 indicates a horseshoe of the ordinary construction, and 2 my improved spring heel, said spring heels being produced in sizes to fit the different sizes of horseshoes. The spring heel 2, as shown in Fig. 4, is of substantially U shape and is formed of a resilient or spring metal and is provided with a heel portion 3, side spring arm portions 4 and the inwardly extending attaching ears 5.

As will appear by reference to Fig. 3, the device is of a gradual diminishing thickness from the heel portion 3 to the forward or attaching portions 5, said heel portion 3 having added thereto the increased width or forwardly extending portion, as shown at 6. Said heel portion including the portion 6 thereof is of substantial thickness and is adapted to withstand the wear, it being with the toe portion of the shoe the part of the device that comes into contact with the ground. The forwardly extending portion 6 of the device has an additional function in that it acts to support the rear frog portion of the hoof of the animal, said portion having a tendency to fall in animals used extensively on hard pavements. This portion of the device when the weight of the animal depresses the heel is in a position to support the rear portion of the frog and prevent its irritation through contact with the ground, supporting the part when the spring is depressed and the greatest weight is on the hoof.

As above stated, the device will be made in different sizes, and if necessary, in rights and lefts, so that the proper size may be chosen to fit the shoe.

In applying the device to a shoe, it will be necessary to select a spring heel having the proper dimensions as to width across the heel portion which should correspond approximately with the outer dimensions of the heel or rear portion of the shoe, also the arms 4 of the spring heel should have approximately the same curvature as the shoe and parallel the shoe up to slightly beyond or forward of one or more of the rearmost nail holes on both sides thereof with the inner edges of the arms 4 in vertical alinement with the corresponding inner edges of the shoe. When placed in position on the under face of the shoe, the extensions 5 will assume a position, as indicated in dots on Fig. 2 of the drawings. Said extensions with the adjoining portions of the shoe are heated to a welding heat, the portions 5 are bent over, as shown in full lines, to firmly grip the shoe and are welded or brazed thereto. Perforations 7 are punched in the forward outer end of the arms 4 in alinement with corresponding nail holes in the shoe, and through which the nails are driven where attaching the shoe to the hoof, thereby providing a permanent and secure means of attachment of the parts.

In devices of this character, it has been the practice to construct a shoe of a particular character, usually more or less complicated, in which shoulders and flanges as well as screw-threaded apertures having screws inserted therein, said shoes being usually provided with a cushioning substance such as rubber or other perishable substance, with means for retaining said parts in place, thereby barring said devices from general use owing to cost. Such shoes need expert work in their production, more or less machine work and frequent attention.

In a device of the character described, the functions desired are attained at very low cost, said device being applied either to a new shoe or an old one, no special construction in the shoe is required and no parts that may work out of place or become detached are used, the device is in one piece which, when attached to the shoe, becomes practically a part thereof and cannot with the rough usage to which it is subjected, become displaced.

Having thus described my invention, what I claim is:—

As an article of manufacture, a spring heel device for attachment to the under face of a horseshoe consisting of a substantially U-shaped spring metal plate having its rear portion including the portion joining the legs of the U relatively thick and the forward ends of the legs of the U relatively thin, the forward portions of the legs of the U being each provided on their upper faces with a bearing surface adapted to contact with the under face of the shoe and being each provided at its forward end with an inwardly extending portion adapted to be bent about and secured to the shoe.

This specification signed and witnessed this 14th day of April A. D. 1915.

GORDON H. BURKE.

In presence of—
ALICE A. KIMBALL,
WM. A. KIMBALL.

Copies of this patent may be obtained for five cents each, by addressing the "Commissioner of Patents, Washington, D. C."